(12) United States Patent
Schierl et al.

(10) Patent No.: US 12,726,321 B2
(45) Date of Patent: Sep. 1, 2026

(54) FLEXIBLE CROSS TRANSMISSION-TIME-INTERVAL DATA PORTION TRANSMISSION IN A WIRELESS COMMUNICATION SYSTEM

(71) Applicant: Fraunhofer-Gesellschaft zur Foerderung der angewandten Forschung e.V., Munich (DE)

(72) Inventors: Thomas Schierl, Berlin (DE); Cornelius Hellge, Berlin (DE); Yago Sánchez De La Fuente, Berlin (DE); Bernd Holfeld, Berlin (DE); Thomas Wirth, Kleinmachnow (DE); Thomas Fehrenbach, Berlin (DE); Dennis Wieruch, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 234 days.

(21) Appl. No.: 16/447,042

(22) Filed: Jun. 20, 2019

(65) Prior Publication Data

US 2019/0305913 A1 Oct. 3, 2019

Related U.S. Application Data

(63) Continuation of application No. PCT/EP2017/083783, filed on Dec. 20, 2017.

(30) Foreign Application Priority Data

Dec. 23, 2016 (EP) .................................... 16206791

(51) Int. Cl.
*H04L 5/00* (2006.01)
*H04L 1/1867* (2023.01)
(Continued)

(52) U.S. Cl.
CPC ............ *H04L 5/0082* (2013.01); *H04L 1/189* (2013.01); *H04L 5/0044* (2013.01);
(Continued)

(58) Field of Classification Search
CPC ..... H04L 5/0082; H04L 1/189; H04L 5/0044; H04L 5/0053; H04L 5/0078; H04W 72/0446; H04W 72/0453; H04W 72/1257
See application file for complete search history.

(56) References Cited

U.S. PATENT DOCUMENTS

| | | | |
|---|---|---|---|
| 2005/0143018 | A1 | 6/2005 | Shinozaki |
| 2006/0250940 | A1 | 11/2006 | Tirkkonen et al. |

(Continued)

FOREIGN PATENT DOCUMENTS

| | | | |
|---|---|---|---|
| CN | 101043291 | A | 9/2007 |
| CN | 101675620 | A | 3/2010 |

(Continued)

OTHER PUBLICATIONS

"Ericsson: Increased TTI Length", 3GPP Draft; R2-060868, 3rd Generation Partnership Project (3GPP), vol. RAN WG2, No. Athens, Greece, 20660323, Mar. 23, 2006 (Mar. 23, 2006), XP050131009, Mar. 23, 2006.

(Continued)

*Primary Examiner* — Un C Cho
*Assistant Examiner* — Alan L Lindenbaum
(74) *Attorney, Agent, or Firm* — Perkins Coie LLP; Michael A. Glenn

(57) ABSTRACT

A receiver for a wireless communication system, wherein the receiver is configured to receive a data signal having a time domain and a frequency domain, the data signal including control data and payload data, the data signal further including at least one data portion including at least one payload data transport block including a payload data pack-
(Continued)

age consisting of a portion of the payload data, wherein the data signal is received over transmission time intervals, wherein a length of one of the transmission time intervals is shorter than the duration of the data portion, so that the data portion is received over more than one of the transmission time intervals, and wherein the receiver includes a signal processing device configured for processing the data portion which have been received over more than one of the transmission time intervals.

18 Claims, 6 Drawing Sheets

(51) Int. Cl.
*H04W 72/0446* (2023.01)
*H04W 72/0453* (2023.01)
*H04W 72/50* (2023.01)

(52) U.S. Cl.
CPC .......... *H04L 5/0053* (2013.01); *H04L 5/0078* (2013.01); *H04W 72/0446* (2013.01); *H04W 72/0453* (2013.01); *H04W 72/535* (2023.01)

(56) References Cited

U.S. PATENT DOCUMENTS

2008/0219235 A1 9/2008 Ma et al.
2008/0267126 A1 10/2008 Vujcic et al.
2008/0267157 A1 10/2008 Lee et al.
2008/0313521 A1 12/2008 Frederiksen et al.
2009/0257385 A1 10/2009 Meylan et al.
2010/0067412 A1* 3/2010 Kitazoe ................ H04L 1/1812 370/294
2010/0075686 A1 3/2010 Farajidana et al.
2010/0322177 A1 12/2010 Luo et al.
2011/0268046 A1 11/2011 Choi et al.
2013/0100840 A1 4/2013 Johansson et al.
2013/0128876 A1 5/2013 Kilian et al.
2013/0242729 A1 9/2013 Chen et al.
2013/0242889 A1* 9/2013 Khoryaev ............ H04L 1/0033 370/329
2014/0003381 A1 1/2014 Lee et al.
2014/0087721 A1 3/2014 Dimou
2014/0098781 A1 4/2014 Vos et al.
2014/0119331 A1 5/2014 Ji et al.
2014/0146758 A1 5/2014 Lovell et al.
2014/0286255 A1 9/2014 Nam et al.
2014/0321418 A1 10/2014 Rinne et al.
2014/0362832 A1* 12/2014 Rudolf .................. H04L 1/1864 370/336
2015/0085796 A1* 3/2015 Xu .................... H04W 72/0493 370/329
2016/0094895 A1 3/2016 Stadelmeier et al.
2016/0119948 A1 4/2016 Damnjanovic et al.
2016/0135170 A1 5/2016 Chen et al.
2016/0226650 A1 8/2016 Chen et al.
2016/0353478 A1 12/2016 Kim
2017/0280438 A1* 9/2017 Balachandran ......... H04W 4/06

FOREIGN PATENT DOCUMENTS

| | | | |
|---|---|---|---|
| CN | 102160448 | A | 8/2011 |
| CN | 103109483 | A | 5/2013 |
| CN | 103856295 | A | 6/2014 |
| CN | 104040930 | A | 9/2014 |
| CN | 104756573 | A | 7/2015 |
| CN | 104823501 | A | 8/2015 |
| CN | 104854955 | A | 8/2015 |
| CN | 105284068 | A | 1/2016 |
| EP | 2816858 | A1 | 12/2014 |
| JP | 2010531103 | A | 9/2010 |
| KR | 20080058464 | A | 6/2008 |
| KR | 20140012675 | A | 2/2014 |
| KR | 20140142237 | A | 12/2014 |
| KR | 20160105832 | A | 9/2016 |
| RU | 2533871 | C2 | 11/2014 |
| WO | 2008157692 | A2 | 12/2008 |
| WO | 2009132236 | A2 | 10/2009 |
| WO | 2010022070 | A1 | 2/2010 |
| WO | 2016064544 | A1 | 4/2016 |

OTHER PUBLICATIONS

"Frame Structure and Numerology for New RAT", Cohere Technologies, Telefonica, Telstra: 3GPP TSG RA WG1 Meeting #84bis R1-162931 Busan, South Korea, Apr. 11-15, 2016, Apr. 11, 2016.

* cited by examiner

DS
f
TTI
DP2
DP1
PTB2
PTB1
SPI
t
PTB2
DP2

FLEXIBLE CROSS TRANSMISSION-TIME-INTERVAL DATA PORTION TRANSMISSION IN A WIRELESS COMMUNICATION SYSTEM

CROSS-REFERENCES TO RELATED APPLICATIONS

This application is a continuation of copending International Application No. PCT/EP2017/083783, filed Dec. 20, 2017, which is incorporated herein by reference in its entirety, and additionally claims priority from European Application No. EP 16 206 791.2, filed Dec. 23, 2016, which is incorporated herein by reference in its entirety.

BACKGROUND OF THE INVENTION

The present invention concerns the field of wireless communication systems, for example wireless mobile communication systems, in which data is transmitted from a transmitter to one or more receivers, like mobile terminals, wherein the transmitter and/or the receiver may form a part of a base station of the wireless communication system or of a mobile terminal of the wireless communication system. Embodiments of the invention concern the transmission of data in such a system with a reduced end-to-end latency.

The lengths of the transmission time intervals that are used in mobile communications are a compromise among several aspects, such as granularity with which users can be assigned to resources, end-to-end latency and robustness (time diversity).

In order to achieve a low end-to-end delay, the shorter the transmission time intervals are the better. However, the shorter the transmission time intervals are, the smaller is the time diversity and this can result in a lower robustness, leading to errors and in the end in a higher number of retransmissions that increases the end-to-end delay. On the contrary, if the transmission time intervals are enlarged, a better robustness is achieved but the end-to-end delay is higher.

SUMMARY

An embodiment may have a receiver for a wireless communication system, wherein the receiver is configured to receive a data signal having a time domain and a frequency domain, the data signal having control data and payload data, the data signal further having at least one data portion having at least one payload data transport block having a payload data package having of a portion of the payload data, wherein the data signal is received over transmission time intervals, wherein a length of one of the transmission time intervals is shorter than the duration of the data portion, so that the data portion is received over more than one of the transmission time intervals, wherein the receiver has a signal processing device configured for processing the data portion which have been received over more than one of the transmission time intervals), wherein the length of one of the transmission time intervals is shorter than the duration of the payload data transport block, so that the payload data transport block is received over more than one of the transmission time intervals, wherein the signal processing device is configured for processing the payload data transport block which have been received over more than one of the transmission time intervals), wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion has a plurality of the resource elements allocated to payload data), and wherein the control data has frequency range data, which indicates which of the frequency ranges of the data signal are assigned to the payload data transport block for each of the transmission time intervals over which the payload data transport block is received, wherein the signal processing device is configured for using the frequency range data for processing the payload data transport block.

Another embodiment may have a transmitter for a wireless communication system, wherein the transmitter is configured to transmit a data signal having a time domain and a frequency domain, the data signal having control data and payload data, the data signal further having at least one data portion having a payload data transport block having a payload data package having of a portion of the payload data, wherein the transmitter is configured for transmitting the data signal over transmission time intervals, wherein a length of one of the transmission time intervals is shorter than the duration of the data portion, so that the data portion is transmitted over more than one of the transmission time intervals) wherein the length of one of the transmission time intervals is shorter than the duration of the payload data transport block, so that the payload data transport block is transmitted over more than one of the transmission time intervals, wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion has a plurality of the resource elements allocated to payload data, and wherein the transmitter is to receive the control data which has frequency range data, which indicates which of the frequency ranges of the data signal are assigned to the payload data transport block for each of the transmission time intervals over which the payload data transport block is transmitted.

Another embodiment may have wireless communication system, having: an inventive receiver and/or an inventive transmitter.

According to another embodiment, a method for receiving a data signal in a wireless communication system, the method having the steps of: receiving, by a receiver, the data signal having a time domain and a frequency domain, the data signal having control data and payload data, the data signal further having at least one data portion having a payload data transport block having a payload data package having of a portion of the payload data, wherein the data signal is received over transmission time intervals, wherein a length of one of the transmission time intervals is shorter than the duration of the data portion, so that the data portion is received over more than one of the transmission time intervals; and processing, by a signal processing device of the receiver, the data portion which have been received over more than one of the transmission time intervals), wherein the length of one of the transmission time intervals is shorter than the duration of the payload data transport block, so that the payload data transport block is received over more than one of the transmission time intervals, wherein the payload data transport block which have been received over more than one of the transmission time intervals is processed by the signal processing device, wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion has a plurality of the resource elements allocated to payload data, and wherein the control data has frequency range data, which indicates which of the frequency ranges of the data signal are assigned to the payload data transport block for each of the transmission time intervals over which the payload data transport block is received, wherein the frequency range data is used by the signal processing device for processing the payload data transport block.

According to another embodiment, a method for transmitting a data signal in a wireless communication system, the method having the steps of: transmitting, by a transmitter, the data signal in such way, that the data signal has a time domain and a frequency domain, that the data signal has control data and payload data, that the data signal further has at least one data portion having a payload data transport block having a payload data package having of a portion of the payload data, and that the data signal is transmitted over transmission time intervals, wherein a length of one of the transmission time intervals is shorter than the duration of the data portion, so that the data portion is transmitted over more than one of the transmission time intervals), wherein the length of one of the transmission time intervals is shorter than the duration of the payload data transport block, so that the payload data transport block is transmitted over more than one of the transmission time intervals, wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion has a plurality of the resource elements allocated to payload data, and wherein the transmitter receives the control data which has frequency range data, which indicates which of the frequency ranges of the data signal are assigned to the payload data transport block for each of the transmission time intervals over which the payload data transport block is transmitted.

Another embodiment may have a non-transitory digital storage medium having a computer program stored thereon to perform the method for receiving a data signal in a wireless communication system, the method having the steps of: receiving, by a receiver, the data signal having a time domain and a frequency domain, the data signal having control data and payload data, the data signal further having at least one data portion having a payload data transport block having a payload data package having of a portion of the payload data, wherein the data signal is received over transmission time intervals, wherein a length of one of the transmission time intervals is shorter than the duration of the data portion, so that the data portion is received over more than one of the transmission time intervals; and processing, by a signal processing device of the receiver, the data portion which have been received over more than one of the transmission time intervals), wherein the length of one of the transmission time intervals is shorter than the duration of the payload data transport block, so that the payload data transport block is received over more than one of the transmission time intervals, wherein the payload data transport block which have been received over more than one of the transmission time intervals is processed by the signal processing device, wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion comprises a plurality of the resource elements allocated to payload data, and wherein the control data has frequency range data, which indicates which of the frequency ranges of the data signal are assigned to the payload data transport block for each of the transmission time intervals over which the payload data transport block is received, wherein the frequency range data is used by the signal processing device for processing the payload data transport block, when said computer program is run by a computer.

Another embodiment may have a non-transitory digital storage medium having a computer program stored thereon to perform the method for transmitting a data signal in a wireless communication system, the method having the steps of: transmitting, by a transmitter, the data signal in such way, that the data signal has a time domain and a frequency domain, that the data signal has control data and payload data, that the data signal further has at least one data portion having a payload data transport block having a payload data package having of a portion of the payload data, and that the data signal is transmitted over transmission time intervals, wherein a length of one of the transmission time intervals is shorter than the duration of the data portion, so that the data portion is transmitted over more than one of the transmission time intervals), wherein the length of one of the transmission time intervals is shorter than the duration of the payload data transport block, so that the payload data transport block is transmitted over more than one of the transmission time intervals, wherein the data signal has a plurality of frames, each frame having a plurality of subframes, and each subframe having symbols in the time domain and frequency ranges in the frequency domain, wherein a combination of one of the symbols and one of the frequency ranges defines a resource element, wherein the data portion has a plurality of the resource elements allocated to payload data, and wherein the transmitter receives the control data which has frequency range data, which indicates which of the frequency ranges of the data signal are assigned to the payload data transport block for each of the transmission time intervals over which the payload data transport block is transmitted, when said computer program is run by a computer.

In one aspect the invention provides a receiver for a wireless communication system, wherein the receiver is configured to receive a data signal having a time domain and a frequency domain, the data signal comprising control data and payload data, the data signal further comprising at least one data portion comprising at least one payload data transport block comprising a payload data package consisting of a portion of the payload data, wherein the data signal is received over transmission time intervals, wherein a length of one of the transmission time intervals is shorter than the duration of the data portion, so that the data portion is received over more than one of the transmission time intervals, and wherein the receiver comprises a signal processing device configured for processing the data portion which have been received over more than one of the transmission time intervals.

A receiver according to the preceding claim, wherein the length of one of the transmission time intervals is shorter than the duration of the payload data transport block, so that the payload data transport block is received over more than one of the transmission time intervals, and wherein the signal processing device is configured for processing the payload data transport block which have been received over more than one of the transmission time intervals The wireless communication system may be in particular a cellular wireless communication system. The receiver may form part of a base station of the wireless communication system. In other embodiments the receiver may form a part of a wireless mobile terminal configured for wireless communication with a fixed base station of the wireless communication system.

Payload data of such data which contain the content of the data signal. In contrast to that, control data are such data which is used to control the communication within the wireless communication system.

A transmission time interval defines at what points in time a transmission of a data portion may be started. This means that a transmission of a data portion may only be started at the beginning of a transmission time interval. Usually all transmission time intervals are of the same duration, however, the duration of transmission time intervals may be adapted dynamically.

A data portion is a portion of the data signal which is encoded independently from other data portions and which is encoded as a whole. A payload data transport block is a portion of the data signal which comprises a payload data package consisting of a portion of the payload data. In some embodiments the data portion consists of solely one payload data transport block. In other embodiments the data portion consists of one or more payload data transport blocks.

According to the invention, a length of one of the transmission time intervals is shorter than the duration of the data portion so that the data portion is received over more than one of the transmission time intervals. Furthermore, the receiver comprises a signal processing device which is capable of processing such data portions which have been received over more than one of the transmission time intervals.

This means that a maximum time-to-send at the transmitter side is shorter than in conventional technology systems, for example in conventional technology systems as defined in the standard Long Term Evolution 4 G (LTE 4G), in which a length of the transmission time intervals is equal to the duration of the data portion. Due to the latter, the duration of transmission time intervals in LTE 4G is defined as 1 ms. According to the invention the transmission time intervals can be significantly shorter, without changing the duration of the data portion, so that the robustness is maintained but the maximum time-to-send at the transmitter side is reduced. Thus, the end-to-end latency in the wireless fornication system is also reduced.

The invention avoids transmission time intervals which are overlapping in time. Thus, increased synchronization complexities are avoided. Moreover, the invention avoids shortening of data portions which would lead to a lower robustness.

According to an embodiment of the invention the data signal comprises a plurality of frames, each frame including a plurality of subframes, and each subframe having symbols in the time domain and frequency ranges in the frequency domain, and wherein a combination of one of the symbols and one of the frequency ranges defines a resource element, and wherein the data portion consists of a plurality of the resource elements allocated to payload data.

The frames, the subframes, the symbols and the frequency ranges can be defined analogously to the existing standard LTE 4G. However, the invention also may be used in connection with other structures of the data signal.

According to an embodiment of the invention the control data comprises frequency range data, which indicates which of the frequency ranges of the data signal are assigned to the payload data transport block for each of the transmission time intervals over which the payload data transport block is received, wherein the signal processing device is configured for using the frequency range data for processing the payload data transport block.

According to an embodiment of the invention the control data comprises allocation data, which indicates to which of the transmission time intervals the payload data transport block is allocated, wherein the signal processing device is configured for using the allocation data for processing the payload data transport block.

According to an embodiment of the invention the control data comprises start data, which indicates at what point in time within the respective transmission time interval the payload data transport block starts, wherein the signal processing device is configured for using the start data for processing the payload data transport block.

According to an embodiment of the invention the control data comprises end data, which indicates at what point in time within the respective transmission time interval the payload data transport block ends, wherein the signal processing device is configured for using the end data for processing the payload data transport block.

The receiver according to the invention may be configured to use the frequency range data, the location data, the start data and/or the end data for the payload data transport block in order to identify those portions of the data signal, which belong to a certain payload data transport block. Thus, extracting a payload data transport block from the data signal as possible in an easy way, even if the payload data transport block and/or the data portion span over more than one transmission time interval.

The frequency range data, the location data, the start data and/or the end data for the payload data transport block may be contained in a control channel such as the physical downlink control channel (PDCCH), for example in a downlink control information (DCI). If said data are contained in the downlink control information, the data may be changed dynamically from transmission time interval to transmission time interval, so that the data are valid only for a current transmission time interval. Another option would be a more persistent configuration, e.g. a bearer configuration message of the Radio Resource Configuration (RRC) that applies to all transmission time intervals for which the configuration applies.

According to an embodiment of the invention the data portion comprises a redundancy data transport block comprising a redundancy data packet comprising payload data being redundant to the payload data package of the payload data transport block, wherein the signal processing device is configured for using the redundancy data packet for restoring the payload data transport block in case of a data loss.

In embodiments the data portion consists of at least one payload data transport block and of at least one redundancy data transport block. The redundancy data packet of the redundancy data transport block is part of the payload data of the data signal. The redundancy data transport block may be used to restore the payload data transport block if during the transmission of the payload data transport block a data loss occurs. Such an error correction is also referred to as forward error correction. Forward error correction avoids a retransmission of payload data transport block after data loss or error in many cases. The payload data transport block and the redundancy data transport block, which are transmitted in the same data portion, may be transmitted one after the other, parallel over time or interleaved over time. This leads to a higher robustness of the data transmission.

The redundancy data transport block may also be used for hybrid error correction which combines forward error correction and error correction by retransmissions. For example, the redundancy data transport block may be used in a hybrid automatic repeat request (hybrid ARQ or HARQ) system, which is a combination of high-rate forward error-correcting coding and automatic repeat request (ARQ) error-control. In standard ARQ, redundant bits belonging to the control data are added to payload data to be transmitted using an error-detecting (ED) code such as a cyclic redundancy check (CRC). Receivers detecting a corrupted message will request a new message from the transmitter. In Hybrid ARQ, the original data is encoded with a forward error correction (FEC) code belonging to the payload data, and the parity bits are either immediately sent along with the message or only transmitted upon request when a receiver detects an erroneous message. The ED code may be omitted when a code is used that can perform both forward error correction in addition to error detection, such as a Reed-Solomon code. The FEC code is chosen to correct an expected subset of all errors that may occur, while the ARQ method may be used as a fallback to correct errors that are uncorrectable using only the redundancy sent in the initial transmission. As a result, hybrid ARQ performs better than ordinary ARQ in poor signal conditions.

In an embodiment of the invention the redundancy data transport block provides an absolute redundancy for the payload data package of the payload data transport block. Absolute redundancy is given, if the redundancy data transport block provides 100% of the information which is contained in the related payload data transport block. In such case it is possible to restore the payload data transport block by using the redundancy data even if the payload data transport block is completely lost.

In an embodiment of the invention the redundancy data transport block provides a relative redundancy for the payload data package of the payload data transport block. Relative redundancy is given, if the redundancy data transport block provides less than 100% of the information which is contained in the related payload data transport block. If, for example, the redundancy data transport block provides 20% of the information contained in the payload data transport block, the payload data transport block may be restored if not more than 20% of information of the payload data transport block are lost. By the use of a relative redundancy the size of the redundancy data transport block may be reduced to the same percentage to which the information is reduced. In the example above, the size of the redundancy data transport block for redundancy of 20% is just 20% of the size of the redundancy data transport block for redundancy.

According to an embodiment of the invention the control data comprises redundancy data, which indicates an amount of redundancy being provided by the redundancy data packet. These features allow extracting the redundancy data transport block from the data signal in an easy way.

According to an embodiment of the invention the control data comprises frequency range data, which indicates which of the frequency ranges of the data signal are assigned to the redundancy data transport block for each of the transmission time intervals over which the redundancy data transport block is received, wherein the signal processing device is configured for using the frequency range data for processing the redundancy data transport block.

According to an embodiment of the invention the control data comprises allocation data, which indicates to which of the transmission time intervals the redundancy data transport block is allocated, wherein the signal processing device is configured for using the allocation data for processing the redundancy data transport block.

According to an embodiment of the invention the control data comprises start data, which indicates at what point in time within the respective transmission time interval the redundancy data transport block starts, wherein the signal processing device is configured for using the start data for processing the redundancy data transport block.

According to an embodiment of the invention the control data comprises end data, which indicates at what point in time within the respective transmission time interval the redundancy data transport block ends, wherein the signal processing device is configured for using the end data for processing the redundancy data transport block.

The receiver according to the invention may be configured to use the redundancy data, the frequency range data, the location data, the start data and/or the end data for redundancy data transport block in order to identify those portions of the data signal, which belong to a certain redundancy data transport block. Thus, extracting a redundancy data transport block from the data signal as possible in an easy way, even if the redundancy data transport block and/or the data portion span over more than one transmission time interval.

The redundancy data, the frequency range data, the location data, the start data and/or the end data may be contained in a control channel such as a physical downlink control channel (PDCCH), for example in a downlink control information (DCI). If said data are contained in the downlink control information, the data may be changed dynamically from transmission time interval to transmission time interval, so that the data are valid only for a current transmission time interval. Another option would be a more persistent configuration, e.g. a bearer configuration message of the Radio Resource Configuration (RRC) that applies to all transmission time intervals for which the configuration applies.

According to an embodiment of the invention the data portion complies with a semi-persistent scheduling scheme, wherein the signal processing device is configured for processing the data portion complying with the semi-persistent scheduling scheme.

Semi-persistent scheduling (SPS) refers to schemes, in which the resources within the data signal are allocated periodically to a communication link, wherein the periodicity may be adjusted. Such schemes allow a reduction of control data.

SPS is used for services with periodic resource demands, and different applications may involve different arrival times of transport blocks which may be configured by the SPS interval parameters. For example, Voice over IP (VoIP) is an application where data arrives in periodic bursts of 20 milliseconds. Beyond that, there are mission-critical and latency-constrained communications services; for example, ultra reliable low latency communication (URLLC) services, such as in machine-type communication and in vehicular communication, which involve pre-configured resources in shorter periods of time; for example, in periods of below 10 milliseconds down to the micro-second level and below. Applying SPS to such applications or services leads to the least possible signaling overhead when compared to frequent dynamic configuration updates, and embodiments of the present invention address SPS for such latency-constrained applications.

According to the invention a SPS interval or periodicity is tied to the transmission time interval domain, thereby allowing implementing the SPS also for latency-constrained applications in which the periodic transmission of transport blocks is needed at certain intervals which may be freely defined on the basis of the transmission time interval. In accordance with embodiments, the base station may configure the user equipment to perform SPS on the basis of a predefined interval as needed by an application, and the SPS interval may be any multiple of the transmission time interval used by the user equipment for data transmission. The transmission time until the to be used by the user equipment may be specified by the base station upon setting up the user equipment. Also, applications may be serviced using SPS, wherein such applications involve a periodicity for the transmission of data on allocated resources at intervals which are below the length of one subframe down to as slow as 1 millisecond or even to below 1 millisecond.

Thus, in accordance with embodiments of the present invention a receiver may be configured to receive data on certain allocated resources over the wireless communication system with a predefined periodicity, wherein the periodicity is based on the transmission time interval for a data block to be received, the receiver, such as a mobile terminal, configured to receive and process a corresponding configuration message from a transmitter, such as a base station, to perform the semi-persistent scheduling. The semi-persistent scheduling may be used for uplink or downlink. Depending on the apparatus being base station or mobile terminal, the apparatus may transmit payload data via allocated resources including, but not exclusively, those scheduled semi-persistently, in units of the transmission time intervals by scrambling and/or interleaving the payload data along with FEC data protecting the payload data before mapping the payload data onto the allocated resources, or receives payload data via allocated resources in units of transmission time intervals by descrambling and/or de-interleaving the payload data along with FEC data protecting the payload data upon de-mapping the payload data from the allocated resources. In other words, in accordance with embodiments, the apparatus is configured to perform a semi-persistent scheduling so as to receive or transmit data in plurality of subsequent intervals on certain allocated resources of the wireless communication system, wherein the size of an interval is based on the transmission time interval for a data block to be received.

According to an embodiment of the invention the control data comprises scheduling scheme data, which indicates whether the data portion complies with the semi-persistent scheduling scheme, wherein the signal processing device is configured for using the scheduling scheme data for processing the data portion.

In some embodiments of the invention the processing device is configured in a first mode of operation to process data portions complying with the semi-persistent scheduling scheme and in a second mode of operation to process startup options complying with another scheduling scheme. The scheduling scheme data may be used in order to select the correct mode in an easy way.

According to an embodiment of the invention the data signal comprises a plurality of said data portions, wherein the plurality of data portions comprises data portions complying with different semi persistent scheduling schemes. Such features allow adapting the semi-persistent scheduling to an eventual need of resources of the data signal.

According to an embodiment of the invention the data signal comprises a plurality of said payload data transport blocks, wherein the plurality of payload data transport blocks comprises payload data transport blocks having different sizes in the frequency domain, wherein the signal processing device is configured for processing the payload data transport blocks having different sizes in the frequency domain.

According to an embodiment of the invention the data signal comprises a plurality of said payload data transport blocks, wherein the plurality of payload data transport blocks comprises payload data transport blocks having different sizes in the time domain, wherein the signal processing device is configured for processing the payload data transport blocks having different sizes in the time domain.

Such features regarding the variable size of the payload data transport blocks increase the flexibility of the use of the resources of the wireless communication system, so that a degree of capacity utilization may be increased. Increasing the flexibility may especially allow increasing the number of users to whom resources of the data signal are dedicated to.

According to an embodiment of the invention the data signal comprises a plurality of said redundancy data transport blocks, wherein the plurality of redundancy data transport blocks comprises redundancy data transport blocks having different sizes in the frequency domain, wherein the signal processing device is configured for processing the redundancy data transport blocks having different sizes in the frequency domain.

According to an embodiment of the invention the data signal comprises a plurality of said redundancy data transport blocks, wherein the plurality of redundancy data transport blocks comprises redundancy data transport blocks having different sizes in the time domain, wherein the signal processing device is configured for processing the redundancy data transport blocks having different sizes in the time domain.

Such features regarding the variable size of the redundancy data transport blocks further increase the flexibility of the use of the resources of the wireless communication system, so that a degree of capacity utilization may be increased. Increasing the flexibility may especially allow increasing the number of users to whom resources of the data signal are dedicated to.

In a further aspect the invention provides a transmitter for a wireless communication system, wherein the transmitter is configured to transmit a data signal having a time domain and a frequency domain, the data signal comprising control data and payload data, the data signal further comprising at least one data portion comprising a payload data transport block comprising a payload data package consisting of a portion of the payload data, and wherein the transmitter is configured for transmitting the data signal over transmission time intervals, wherein a length of one of the transmission time intervals is shorter than the duration of the data portion, so that the data portion is transmitted over more than one of the transmission time intervals.

The wireless communication system may be in particular a cellular wireless communication system. The transmitter may form part of a base station of the wireless communication system. In other embodiments the transmitter may form a part of a wireless mobile terminal configured for wireless communication with a fixed base station of the wireless communication system.

It has to be understood that the transmitter according to the invention may be configured to produce the data signal in such way as outlined in the context of the receiver, especially as outlined in the claims regarding the receiver.

In another aspect the invention provides a wireless communication system, comprising:

a receiver according to the invention, and/or a transmitter according to the invention.

In another aspect the invention provides a method for receiving a data signal in a wireless communication system, the method comprising the steps:

receiving, by a receiver, the data signal having a time domain and a frequency domain, the data signal comprising control data and payload data, the data signal further comprising at least one data portion comprising a payload data transport block comprising a payload data package consisting of a portion of the payload data, wherein the data signal is received over transmission time intervals, wherein a length of one of the transmission time intervals is shorter than the duration of the data portion, so that the data portion is received over more than one of the transmission time intervals; and processing, by a signal processing device of the receiver, the data portion which have been received over more than one of the transmission time intervals.

In a further aspect the invention provides a method for transmitting a data signal in a wireless communication system, the method comprising:

transmitting, by a transmitter, the data signal in such way, that the data signal has a time domain and a frequency domain, that the data signal comprises control data and payload data, that the data signal further comprises at least one data portion comprising a payload data transport block comprising a payload data package consisting of a portion of the payload data, and that the data signal is transmitted over transmission time intervals, wherein a length of one of the transmission time intervals is shorter than the duration of the data portion, so that the data portion is transmitted over more than one of the transmission time intervals.

In another aspect the invention provides program for, when running on a processor, executing the method according to the invention.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
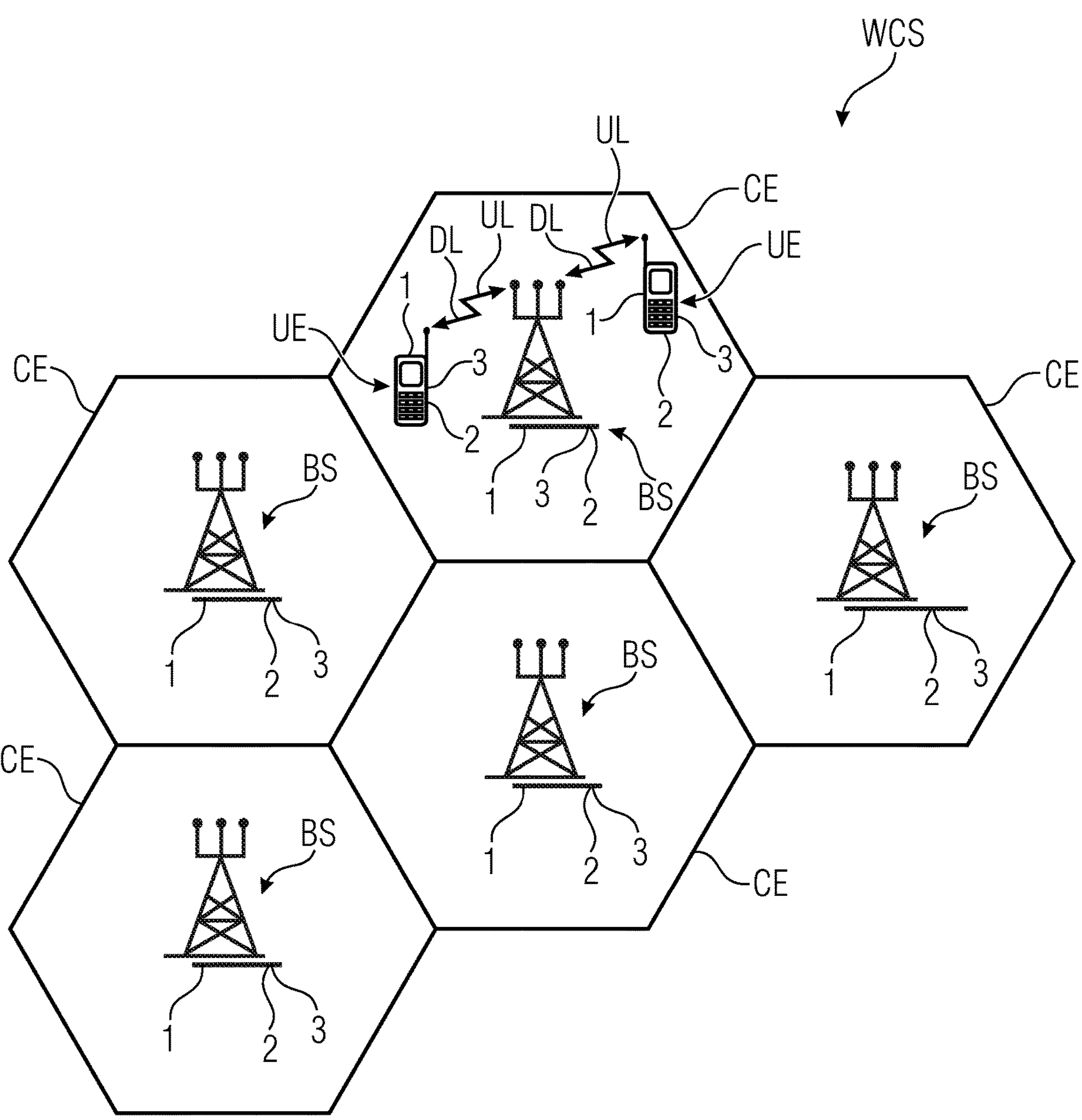
FIG. 1 illustrates an example of a wireless communication system in a schematic view.

FIG. 1 shows a schematic representation of an example of a wireless communication system WCS including a plurality of base stations BS, each serving a specific area surrounding the base station schematically represented by the respective cells CE. The base stations are provided to serve mobile terminals UE that are present within a cell. FIG. 1 shows an exemplary view of only five cells, however, the wireless communication system WCS may include more such cells CE. FIG. 1 shows two mobile terminals UE that are in a cell CE and that are served by one of the base stations BE. The arrows schematically represent an uplink channel UL and a downlink channels DL for transmitting data from a transmitter 2 of the mobile terminal UE to a receiver 1 of the base stations BS or for transmitting data from a transmitter 2 of the base station BS to a receiver 1 of the mobile terminal UE, respectively. The wireless communication system WCS may be an orthogonal frequency-division multiplexing (OFDM) system or an orthogonal frequency-division multiple access (OFDMA) system, as it is, for example, used by the LTE standard or other multicarrier systems based on frequency-division multiplexing. A transmission time interval is the granularity at which the data may be mapped from higher layers to the physical layer (PHY) to perform the transmission. The mobile terminal, also referred to as user equipment, processes the data portions that it receives with a granularity of the transmission time interval. The mobile terminal needs to be synchronized to the radio network and to pass the control information each transmission time interval to see whether some data portion has been sent to it, and, in an affirmative case, the mobile terminal has to decode the data portion.

An OFDMA system for data transmission makes use of an OFDMA-based physical resource grid which comprises a set of resource elements to which various physical channels and physical signals are mapped. For example, in accordance with the LTE standard, the physical channels may include the physical downlink shared channel (PDSCH) carrying user specific data, also referred to as downlink payload data, the physical broadcast channel (PBCH) carrying for example the master information block, the physical downlink control channel (PDCCH) carrying for example the downlink control information (DCI), etc. The physical signals may comprise reference signals, synchronization signals and the like.

Figure 2:
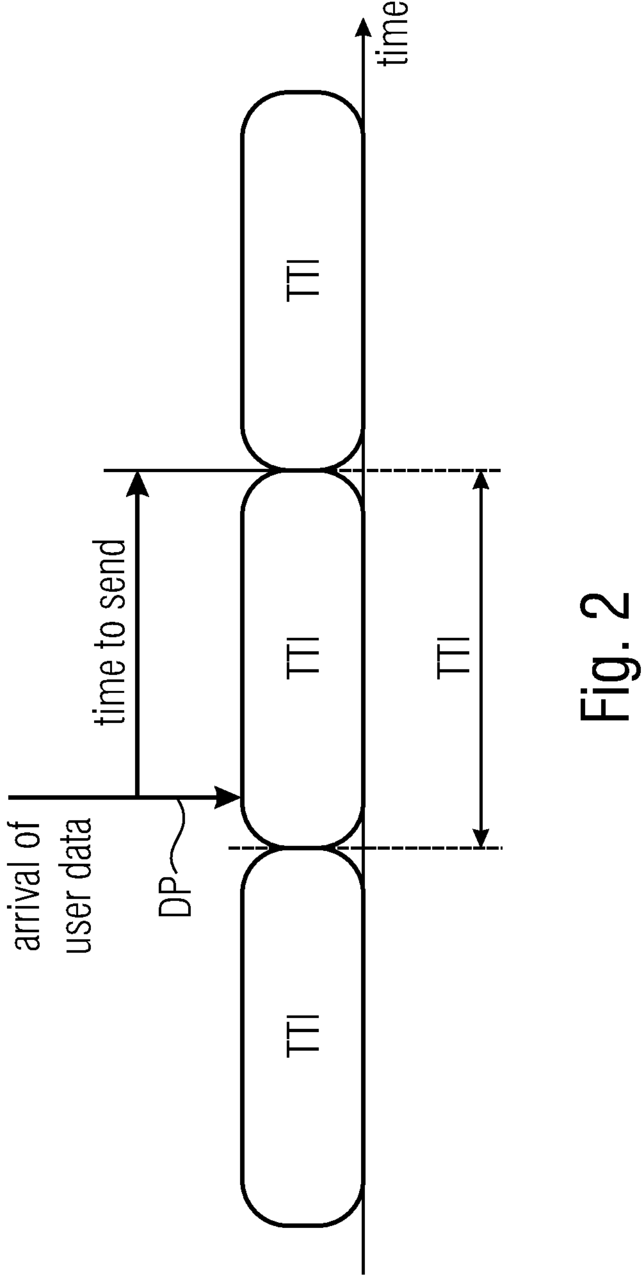
FIG. 2 illustrates the impact of the length of the transmission time intervals on the time to send of a transmission in a wireless communication system.
Figures 3, 4:
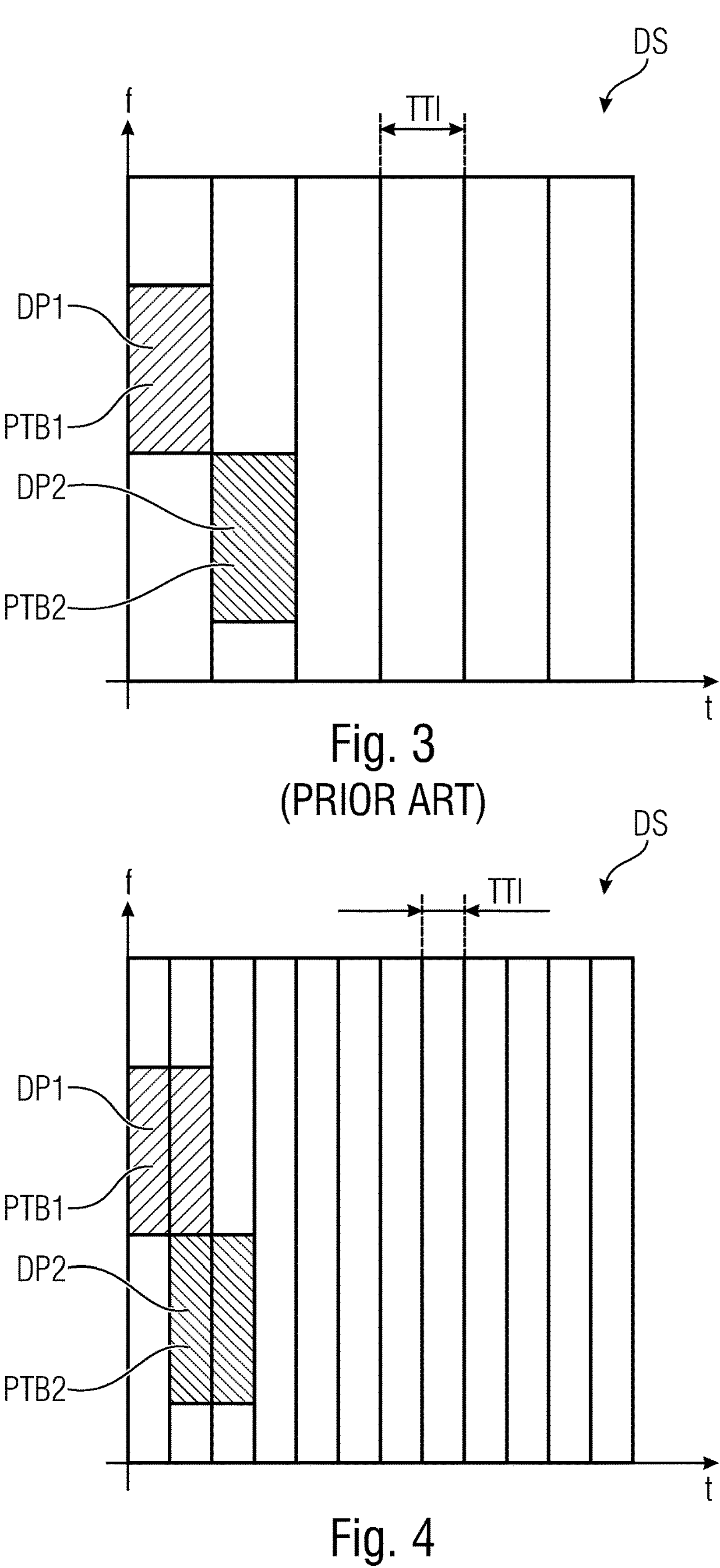
FIG. 3 illustrates an exemplary structure of a data signal in wireless communication system having a transmitter and a receiver according to the conventional technology.
FIG. 4 illustrates an exemplary structure of a data signal in wireless communication system having a transmitter and a receiver according to the invention.

FIG. 2 illustrates the impact of length of the transmission time intervals TTI on the time-to-send of a data portion DP (see FIG. 3). The end-to-end delay in a wireless communication system WCS using transmission time intervals TTI is the sum of the sender-processing-time, the time-to-send, the propagation-time and the receiver-processing-time.

The sender-processing-time is the time, which is needed at the transmitter 2 to process and generate a data portion DP. The time-to-send is the time from the arrival of the processed and generated data portion DT to the beginning of the next transmission time interval TTI at the side of transmitter 2. Further, the propagation-time is the time, which is needed to transfer the whole data portion DP to the receiver 1. Finally, the receiver-processing-time is the time at the receiver to, which is needed to process the data portion DP.

As it's apparent from FIG. 2, the time-to-send depends on the length of the transmission time intervals (which are usually all of the same length), as the processed and generated data portion DP cannot be transmitted before the beginning of the next transmission time interval.

FIG. 3 illustrates an exemplary structure of a data signal DS in wireless communication system WCS having a transmitter 2 and a receiver 1 according to the conventional technology, for example according to the standard LTE G4. The data signal DS comprises a data portion DP1, which consists of a payload data transport block PTB1, and a data portion DP2, which consists of a payload data transport block PTB2. Both data portions DP1 and DP2 are defined by their duration in time and their frequency range. The same is valid for both payload data transport blocks PTB1 and PT2. Furthermore, data signal DS is transmitted and received over transmission time intervals TTI. The duration in time of the data portions DP1 and DP2 (or of the payload data transport blocks PTB1 and PT2) is equal to the transmission time intervals TTI. As a result, the maximum time-to-send is equal to the duration in time of the data portions DP1 and DP2 (or of the payload data transport blocks PTB1 and PT2).

FIG. 4 illustrates an exemplary structure of a data signal DS in wireless communication system WCS having a transmitter 2 and a receiver 1 according to the invention.

The data signal DS in FIG. 4 comprises a data portion DP1, which consists of a payload data transport block PTB1, and a data portion DP2, which consists of a payload data transport block PTB2. Both data portions DP1 and DP2 are defined by their duration in time and their frequency range. The same is valid for both payload data transport blocks PTB1 and PT2. Furthermore, data signal DS is transmitted and received over transmission time intervals TTI. According to the invention a length of transmission time interval TTI is shorter than the duration in time of the data portions DP1 and DP2 (or of the payload data transport blocks PTB1 and PT2).

In the example of FIG. 4 the length of the transmission time intervals TTI is half of the duration in time of the data portions DP1 and DP2 (or of the payload data transport blocks PTB1 and PT2). As a result, the maximum time-to-send is equal to the half of the duration in time of the data portions DP1 and DP2 (or of the payload data transport blocks PTB1 and PT2).

In one aspect the invention provides a receiver 1 for a wireless communication system WCS, wherein the receiver 1 is configured to receive a data signal DS having a time domain and a frequency domain, the data signal DS comprising control data CD and payload data PD, the data signal DS further comprising at least one data portion DP comprising at least one payload data transport block PTB comprising a payload data package consisting of a portion of the payload data PD, wherein the data signal DS is received over transmission time intervals TTI, wherein a length of one of the transmission time intervals TTI is shorter than the duration of the data portion DP, so that the data portion DP is received over more than one of the transmission time intervals TTI, and wherein the receiver 1 comprises a signal processing device 3 configured for processing the data portion DP which have been received over more than one of the transmission time intervals TTI.

In an embodiment of the invention the length of one of the transmission time intervals TTI is shorter than the duration of the payload data transport block PTB, so that the payload data transport block PTB is received over more than one of the transmission time intervals TTI, and wherein the signal processing device 3 is configured for processing the payload data transport block PTB which have been received over more than one of the transmission time intervals TTI.

The data signal DS in FIG. 4 comprises a data portion DP1, which consists of a payload data transport block PTB1, and a data portion DP2, which consists of a payload data transport block PTB2. Both data portions DP1 and DP2 are defined by their duration in time and their frequency range. The same is valid for both payload data transport blocks PTB1 and PT2. Furthermore, data signal DS is transmitted and received over transmission time intervals TTI. According to the invention a length of transmission time interval TTI is shorter than the duration in time of the data portions DP1 and DP2 (or of the payload data transport blocks PTB1 and PT2).

In the example of FIG. 4 the length of the transmission time intervals TTI is half of the duration in time of the data portions DP1 and DP2 (or of the payload data transport blocks PTB1 and PT2). As a result, the maximum time-to-send is equal to the half of the duration in time of the data portions DP1 and DP2 (or of the payload data transport blocks PTB1 and PT2).

In an embodiment of the invention the control data CD comprises frequency range data, which indicates which of the frequency ranges FR of the data signal DS are assigned to the payload data transport block PTB for each of the transmission time intervals TTI over which the payload data transport block PTB is received, wherein the signal processing device 3 is configured for using the frequency range data for processing the payload data transport block PTB.

In the embodiment of the invention the control data CD comprises allocation data, which indicates to which of the transmission time intervals TTI the payload data transport block PTB is allocated, wherein the signal processing device 3 is configured for using the allocation data for processing the payload data transport block PTB.

In the embodiment of the invention the control data CD comprises start data, which indicates at what point in time within the respective transmission time interval TTI the payload data transport block PTB starts, wherein the signal processing device 3 is configured for using the start data for processing the payload data transport block PTB.

In an embodiment of the invention the control data CD comprises end data, which indicates at what point in time within the respective transmission time interval TTI the payload data transport block PTB ends, wherein the signal processing device 3 is configured for using the end data for processing the payload data transport block PTB.

In an embodiment of the invention the data signal DS comprises a plurality of said payload data transport blocks PTB, wherein the plurality of payload data transport blocks PTB comprises payload data transport blocks PTB having different sizes in the frequency domain, wherein the signal processing device 3 is configured for processing the payload data transport blocks PTB having different sizes in the frequency domain.

In an embodiment of the invention the data signal DS comprises a plurality of said payload data transport blocks PTB, wherein the plurality of payload data transport blocks PTB comprises payload data transport blocks PTB having different sizes in the time domain, wherein the signal processing device 3 is configured for processing the payload data transport blocks PTB having different sizes in the time domain.

In a further aspect the invention provides a transmitter 2 for a wireless communication system, wherein the transmitter 2 is configured to transmit a data signal DS having a time domain and a frequency domain, the data signal DS comprising control data CD and payload data PD, the data signal DS further comprising at least one data portion DP comprising a payload data transport block PTB comprising a payload data package consisting of a portion of the payload data PD, and wherein the transmitter 2 is configured for transmitting the data signal DS over transmission time intervals TTI, wherein a length of one of the transmission time intervals TTI is shorter than the duration of the data portion DP, so that the data portion DP is transmitted over more than one of the transmission time intervals TTI.

In another aspect the invention provides a wireless communication system, comprising:

a receiver 1 according to the invention, and/or a transmitter 2 according to the invention.

In a further aspect the invention provides a method for receiving a data signal DS in a wireless communication system WCS, the method comprising the steps:

receiving, by a receiver 1, the data signal DS having a time domain and a frequency domain, the data signal DS comprising control data CD and payload data PD, the data signal DS further comprising at least one data portion DP comprising a payload data transport block PTB comprising a payload data package consisting of a portion of the payload data PD, wherein the data signal DS is received over transmission time intervals TTI, wherein a length of one of the transmission time intervals TTI is shorter than the duration of the data portion DP, so that the data portion DP is received over more than one of the transmission time intervals TTI; and processing, by a signal processing device 3 of the receiver 1, the data portion DP which have been received over more than one of the transmission time intervals TTI.

In another aspect the invention provides a method for transmitting a data signal DS in a wireless communication system WCS, the method comprising:

transmitting, by a transmitter 2, the data signal DS in such way, that the data signal DS has a time domain and a frequency domain, that the data signal DS comprises control data CD and payload data PD, that the data signal DS further comprises at least one data portion DP comprising a payload data transport block PTB comprising a payload data package consisting of a portion of the payload data PD, and that the data signal DS is transmitted over transmission time intervals TTI, wherein a length of one of the transmission time intervals TTI is shorter than the duration of the data portion DP, so that the data portion DP is transmitted over more than one of the transmission time intervals TTI.

In a further aspect the invention provides a computer program for, when running on a processor, executing the method according to invention.

Figure 5:
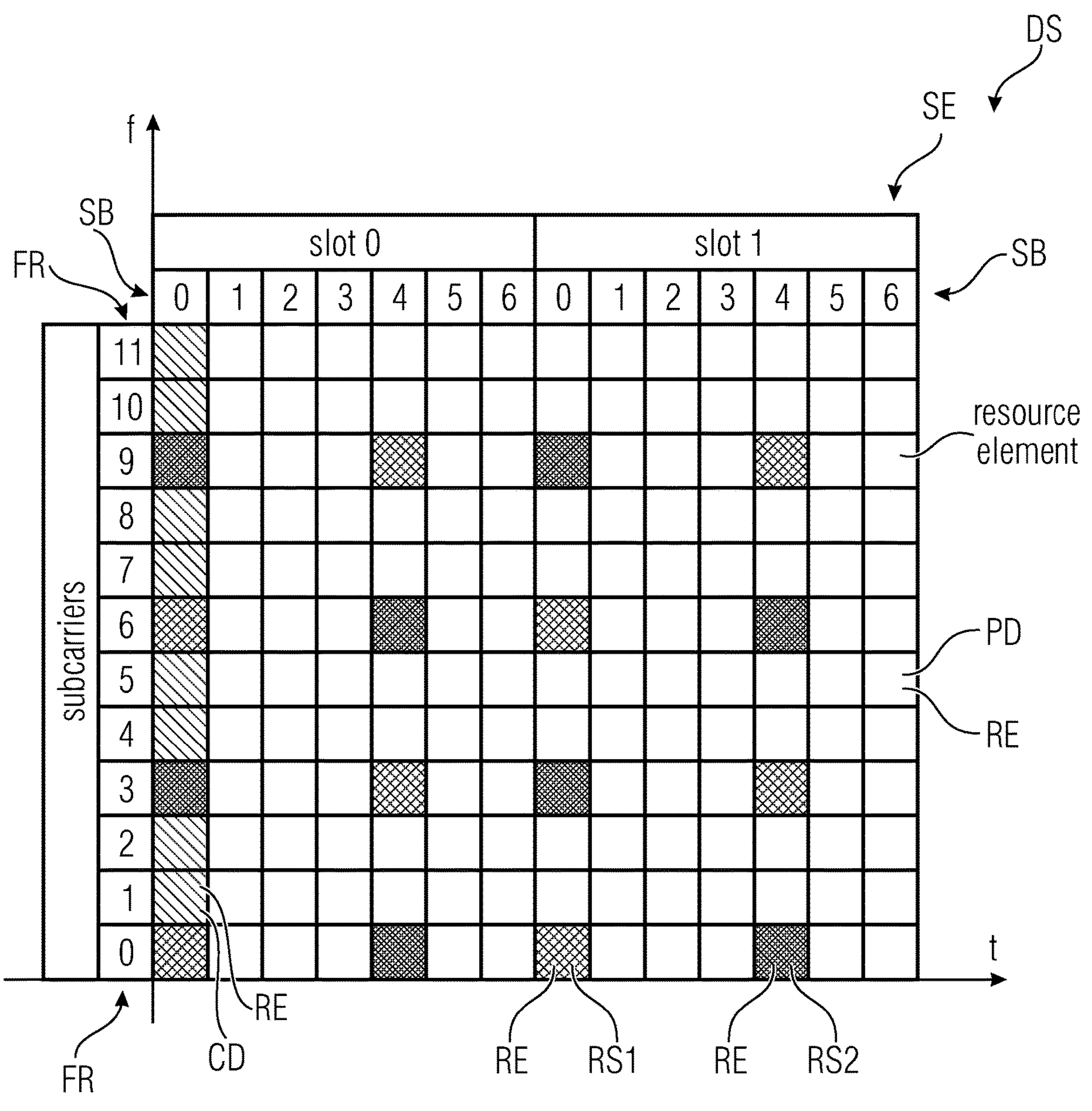
FIG. 5 illustrates an exemplary OFDMA-subframe for a wireless communication system.

FIG. 5 shows an exemplary OFDMA-subframe SF for two antennas ports as it may be used for an LTE communication.

According to an embodiment of the invention the data signal DS comprises a plurality of frames, each frame including a plurality of subframes SF, and each subframe SF having symbols SB in the time domain and frequency ranges FR in the frequency domain, and wherein a combination of one of the symbols SB and one of the frequency ranges FR defines a resource element RE, and wherein the data portion DP consists of a plurality of the resource elements RE allocated to payload data PD.

The depicted subframe SF includes two resource blocks each made up of one slot of the subframe SF and 12 subcarriers in the frequency domain. The subcarriers in the frequency domain are shown as subcarrier 0 to subcarrier 11, and in the time domain, each slot includes OFDM symbols SB 0 to 6. A resource element is made up of one symbol SB in the time domain and one subcarrier in the frequency domain. The white boxes represent resource elements RE allocated to the PDSCH, carrying the payload data PD also referred to as user data. The resource elements RE for the physical control channels carrying control data CD (non-payload or non-user data) are represented by the hatched boxes. The cross-hatched boxes represent resource elements RE which are allocated to the reference signal RS1 that may be used for the channel estimation. The black boxes represent unused resource elements RE in the current antenna port that may correspond to reference signals RS2 in another antenna port. The LTE resource grid, for example, comprises a 10 ms frame in the time domain having a given bandwidth in the frequency domain. The frame has 10 subframes of 1 ms length, and each subframe includes two slots of 6 or 7 OFDM symbols SB depending on the cyclic prefix length.

Figure 6:
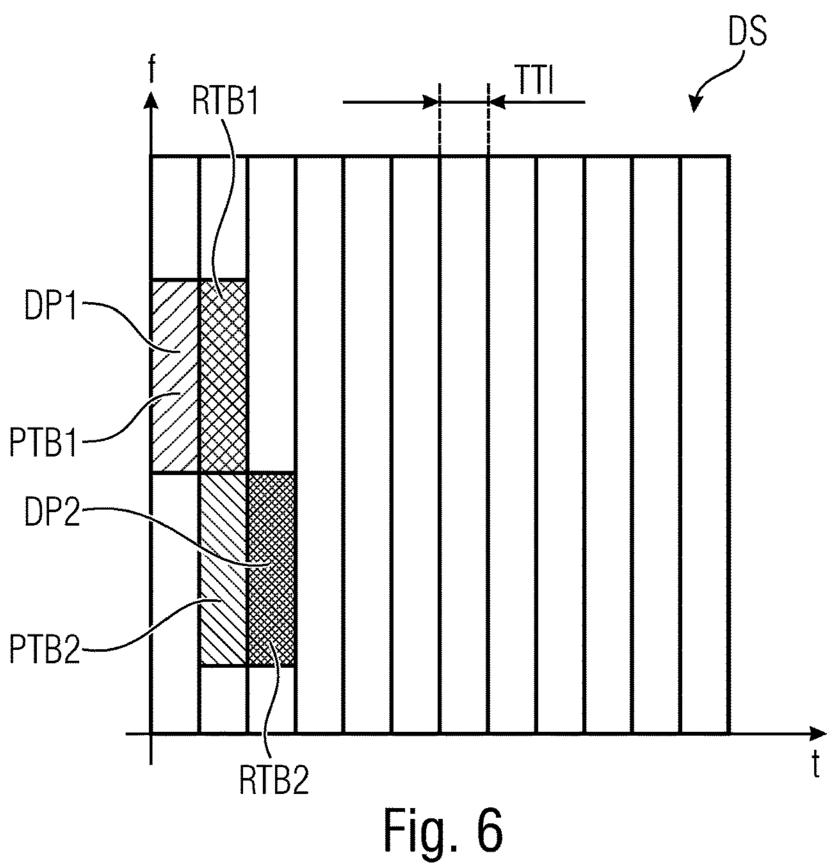
FIG. 6 illustrates a further exemplary structure of a data signal in wireless communication system having a transmitter and a receiver according to the invention.

FIG. 6 illustrates a further exemplary structure of a data signal DS in wireless communication system WCS having a transmitter 2 and a receiver 1 according to the invention.

According to an embodiment of the invention the data portion DP comprises a redundancy data transport block RTB comprising a redundancy data packet comprising payload data PD being redundant to the payload data package of the payload data transport block PTB, wherein the signal processing device 3 is configured for using the redundancy data packet for restoring the payload data transport block PTB in case of a data loss.

The data signal DS in FIG. 6 comprises a data portion DP1, which consists of a payload data transport block PTB1 and the redundancy data transport block RPB1. Furthermore, the data signal DS comprises a data portion DP2, which consists of a payload data transport block PTB2 and the redundancy data transport block RTB2. According to the invention a length of transmission time interval TTI is shorter than the duration in time of the data portions DP1 and DP2.

According to an embodiment of the invention the redundancy data transport block RTB provides an absolute redundancy for the payload data package of the payload data transport block PTB. As shown in FIG. 6, the redundancy data transport blocks RTB1 and RTB2 have a same size as the payload data transport blocks PTB1 and PTB2 in case of full redundancy.

According to an embodiment of the invention the control data CD comprises allocation data, which indicates to which of the transmission time intervals TTI the redundancy data transport block RTB is allocated, wherein the signal processing device 3 is configured for using the allocation data for processing the redundancy data transport block RTB.

According to an embodiment of the invention the control data CD comprises start data, which indicates at what point in time within the respective transmission time interval TTI the redundancy data transport block RTB starts, wherein the signal processing device 3 is configured for using the start data for processing the redundancy data transport block RTB.

According to an embodiment of the invention the control data CD comprises end data, which indicates at what point in time within the respective transmission time interval TTI the redundancy data transport block RTB ends, wherein the signal processing device 3 is configured for using the end data for processing the redundancy data transport block RTB.

Figure 7:
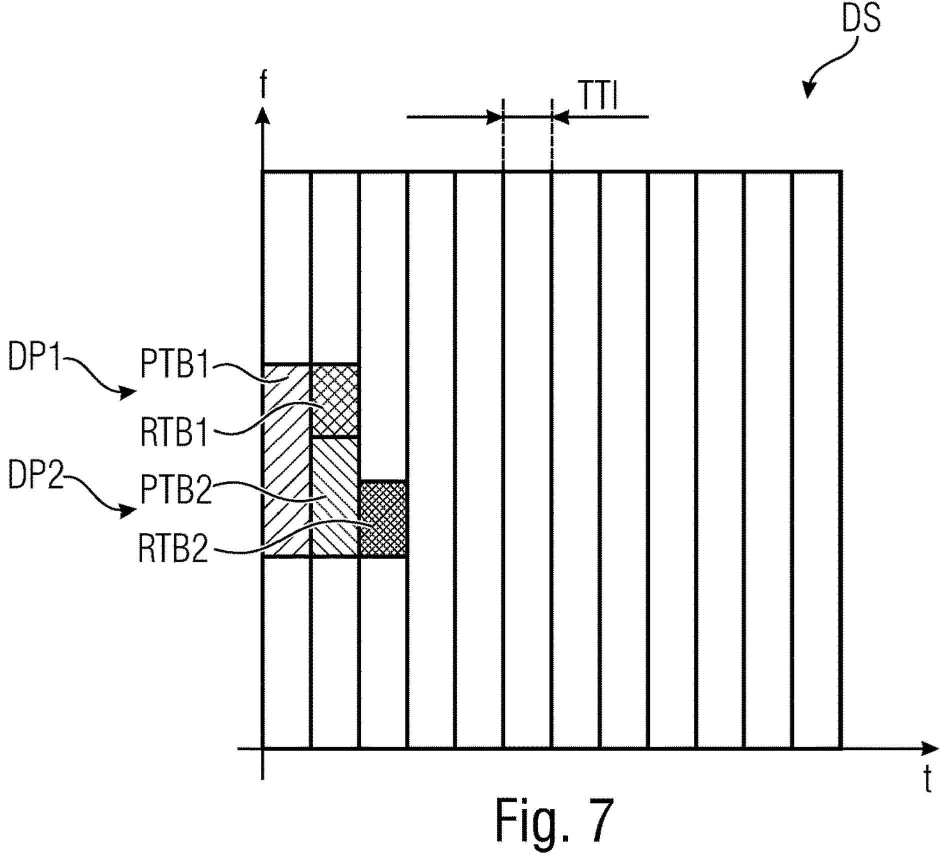
FIG. 7 illustrates an further exemplary structure of a data signal in wireless communication system having a transmitter and a receiver according to the invention.

FIG. 7 illustrates a further exemplary structure of a data signal DS in wireless communication system WCS having a transmitter 2 and a receiver 1 according to the invention.

According to an embodiment of the invention the redundancy data transport block RTB provides a relative redundancy for the payload data package of the payload data transport block PTB. As shown in FIG. 7, the redundancy data transport blocks RTB1 and RTB2 have a smaller size as the corresponding payload data transport blocks PTB1 and PTB2 in case of partial redundancy.

According to an embodiment of the invention the control data CD comprises redundancy data, which indicates an amount of redundancy being provided by the redundancy data packet.

According to an embodiment of the invention the control data CD comprises frequency range data, which indicates which of the frequency ranges FR of the data signal DS are assigned to the redundancy data transport block RTB for each of the transmission time intervals TTI over which the redundancy data transport block RTB is received, wherein the signal processing device 3 is configured for using the frequency range data for processing the redundancy data transport block RTB.

According to an embodiment of the invention the data signal DS comprises a plurality of said redundancy data transport blocks RTB, wherein the plurality of redundancy data transport blocks RTB comprises redundancy data transport blocks RTB having different sizes in the frequency domain, wherein the signal processing device 3 is configured for processing the redundancy data transport blocks RTB having different sizes in the frequency domain.

According to an embodiment of the invention the data signal DS comprises a plurality of said redundancy data transport blocks RTB, wherein the plurality of redundancy data transport blocks RTB comprises redundancy data transport blocks RTB having different sizes in the time domain, wherein the signal processing device 3 is configured for processing the redundancy data transport blocks RTB having different sizes in the time domain.

Figures 8, 9:
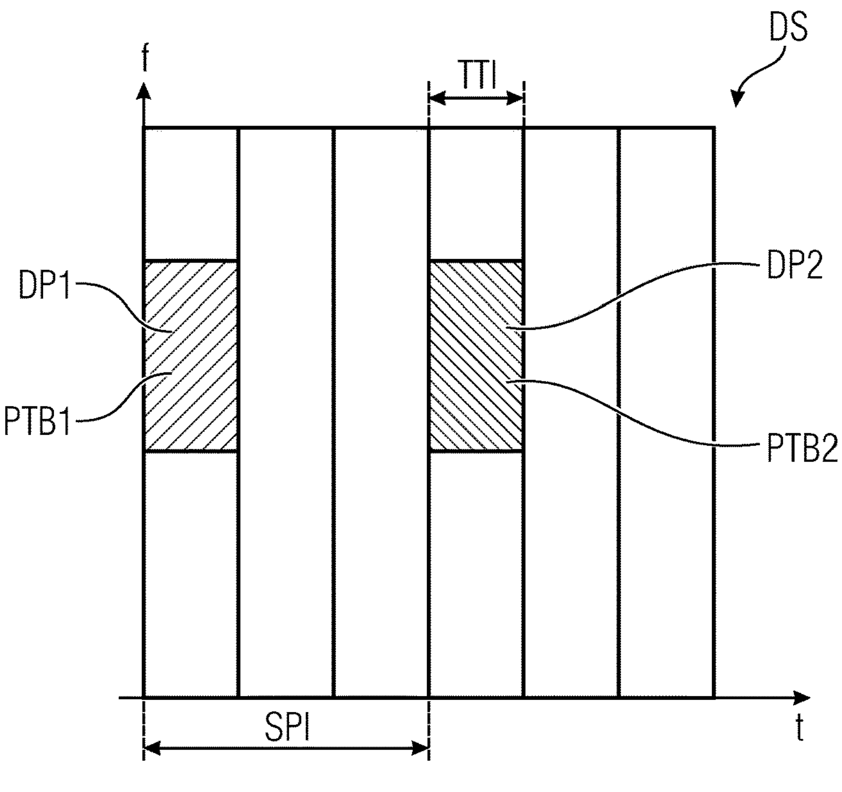
FIG. 8 illustrates a further exemplary structure of a data signal in wireless communication system having a transmitter and a receiver according to the conventional technology.
FIG. 9 illustrates a further exemplary structure of a data signal in wireless communication system having a transmitter and a receiver according to the invention.

FIG. 8 illustrates a further exemplary structure of a data signal DS in wireless communication system WCS having a transmitter to and a receiver 1 according to the conventional technology. A semi persistent scheduling scheme according to the conventional technology is shown, wherein a semi persistent scheduling interval SPI comprises three transmission time intervals TTI. In each semi persistent scheduling interval SPI exactly one transmission time interval TTI is assigned to a user. The frequency range is constant and a length of the transmission time interval TTI is the same as the length of the data portions DP1 and DP2.

FIG. 9 illustrates a further exemplary structure of a data signal in wireless communication system having a transmitter and a receiver according to the invention.

According to an embodiment of the invention the data portion DP complies with a semi-persistent scheduling scheme, wherein the signal processing device 3 is configured for processing the data portion complying with the semi-persistent scheduling scheme.

According to an embodiment of the invention the control data CD comprises scheduling scheme data, which indicates whether the data portion DP complies with the semi-persistent scheduling scheme, wherein the signal processing device 3 is configured for using the scheduling scheme data for processing the data portion DP.

According to an embodiment of the invention the data signal DS comprises a plurality of said data portions DP, wherein the plurality of data portions DP comprises data portions DP complying with different semi persistent scheduling schemes.

In FIG. 9 a semi persistent scheduling scheme according to the invention is shown, wherein a semi persistent scheduling interval SPI comprises six transmission time intervals TTI. In each semi persistent scheduling interval SPI to transmission time intervals TTI are assigned to a user. The frequency range is variable and a length of the transmission time interval TTI is shorter than the length of the data portions DP1 and DP2 (or the length of the payload data transport blocks PTB1 and PTB2.

In order to reduce the latency, “overlapping” transmission time intervals TTI would be desired. However, such “overlapping” transmission time intervals TTI could lead to an additional complexity and potential synchronization complexities. A simpler way of achieving such functionality would be to define short transmission time intervals TTI of a given length, for which transmission of a new data portion DP could start any time and signal the length of the data portions DP in terms of that short transmission time intervals TTI.

In a first embodiment a new signaling mechanism is responsible of signaling in addition to the frequency resource elements for a data portion DP, how many short transmission time intervals TTI are aggregated for that data portions DP, i.e. which short transmission time intervals TTI a given data portions DP spans into.

In a second embodiment, the flexible cross transmission time interval TTI data portions DP transmission is done by configuring a default transmission time interval TTI. Note that the default HARQ may be sent in parallel to new data so that data portions DP can be sent overlapped in time.

A third embodiment applies to signaling a default HARQ strictly following the previous transmission time interval TTI but that only add a given percentage of protection, e.g. 10% or 20% more of redundancy to the data. This signaling could be done either fixed for a whole session, e.g. using an RRC message or flexibly by signaling that every time a resource is dedicated to a user, e.g. DCI.

In some applications there might be some variability on the packet sizes PTB, RTB sent over time at a given frequency. For instance, in case of video, although it could be possible to encode all pictures with the same size (or virtually the same size), the performance of it can be increased by encoding some pictures with higher size than others. In such a case, although the frequency with which data is sent is kept constant over time different sizes are sent at different times, leading to variable bundles of transmission time intervals TTI per semi persistent scheduling interval SPI.

Increasing resources only in the frequency domain by assigning more resource elements RE where more resources are needed (size of the data to be send is bigger) can be detrimental for the system, e.g. less users can be dedicated with resources for a given transmission time interval TTI. Additionally as described above, if done in the time domain the reliability can be increased.

In a further embodiment, the semi persistent scheduling assignation can be configured so that for some of the data portions DP (or all), the of the data portions DP span over more than one transmission time interval TTI.

If only some data portions DP span over more than one transmission time interval TTI and the frequency of those data portions DP is not periodic following a constant transmission time interval TTI, activation of data portions DP spanning over more than one TTI can be done by the presence of a short/small signaling information in the control channel, e.g. small DCI.

In addition the semi persistent scheduling scheme could indicate a default HARQ with a smaller data of redundancy, e.g. 10% or 20%, for instance using incremental redundancy.

In a further embodiment the HARQ for a payload data transport blocks PTB transmitted using resources assigned by an semi persistent scheduling scheme could be included in the beginning of a new transmission indicated by a DCI. For instance if two services are running in parallel, one of those using an semi persistent scheduling scheme and another in a normal mode, transmissions done by the second service could include redundancy for the one using the semi persistent scheduling scheme. Indication of the amount of redundancy could be done by signaling it e.g. in a DCI.

With respect to the receiver, the transmitter and the methods of the described embodiments the following shall be mentioned:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

Depending on certain implementation requirements, embodiments of the invention can be implemented in hardware and/or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Generally, the methods are advantageously performed by any apparatus comprising hardware and or software.

Other embodiments comprise the computer program for performing one of the methods described herein, which is stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may be configured, for example, to be transferred via a data communication connection, for example via the Internet.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE SIGNS

1 receiver
2 transmitter
3 signal processing device
BS base station
CE cell
CD control data
DL down link
DP data portion
DS data signal
FR frequency range PD payload data
PTB payload data transport block
RE resource element
RTB redundancy data transport block
SB symbol
SF subframe
SPI semi persistent scheduling interval
TTI transmission time interval
UE user equipment
UL uplink
WCS wireless communication system

The invention claimed is:

1. A receiver for a wireless communication system, wherein the receiver is configured to receive a data signal comprising a time domain and a frequency domain, the data signal comprising control data and payload data, the data signal further comprising a data portion, and wherein the data portion comprises a payload data transport block, and wherein the payload data transport block comprises a payload data package, and wherein the payload data package comprises a portion of the payload data, and wherein the data signal is received over transmission time intervals, and wherein a length of one of the transmission time intervals is shorter than a duration of the data portion such that the data portion is received over more than one transmission time interval of the transmission time intervals, and wherein the receiver comprises a signal processing device configured for processing the data portion, and wherein the length of one of the transmission time intervals is shorter than the duration of the payload data transport block, and wherein the payload data transport block is received over immediately subsequent transmission time intervals of the transmission time intervals such that the payload data transport block is received over more than one of the immediately subsequent transmission time intervals, and wherein the signal processing device is configured for processing the payload data transport block, and wherein the data signal comprises a plurality of frames, each frame comprising a plurality of subframes, and each subframe comprising symbols in the time domain and frequency ranges in the frequency domain, and wherein a combination of a symbol of the symbols and a frequency range of the frequency ranges defines a resource element, and wherein the data portion comprises a plurality of resource elements allocated to the payload data, and wherein the control data comprises frequency range data, and wherein the frequency range data indicates which subset of ranges of the frequency ranges of the data signal is assigned to the payload data transport block for each of the immediately subsequent transmission time intervals over which the payload data transport block is received, and wherein the frequency range data indicates that different ranges of the frequency ranges are assigned to the payload data transport block for different intervals of the immediately subsequent transmission time intervals over which the payload data transport block is received, wherein the different intervals of the immediately subsequent transmission time intervals to which different ranges of the frequency ranges are assigned to, comprise different portions of the payload data package of the payload data transport block, and wherein the signal processing device is configured for using the frequency range data for processing the payload data transport block.

2. The receiver according to claim 1, wherein the data portion comprises a redundancy data transport block, and wherein the redundancy data transport block comprises a redundancy data packet, and wherein the redundancy data packet comprises payload data that is redundant to the payload data package of the payload data transport block, and wherein the signal processing device is configured for using the redundancy data packet for restoring the payload data transport block in case of a data loss.

3. The receiver according to claim 2, wherein the redundancy data transport block provides an absolute redundancy or a relative redundancy for the payload data package of the payload data transport block.

4. The receiver according to claim 2, wherein the control data comprises redundancy data, which indicates an amount of redundancy that is provided by the redundancy data packet.

5. The receiver according to claim 2, wherein the control data comprises second frequency range data that indicates which subset of ranges of the frequency ranges of the data signal are assigned to the redundancy data transport block for each of the transmission time intervals over which the redundancy data transport block is received, wherein the signal processing device is configured for using the second frequency range data for processing the redundancy data transport block.

6. The receiver according to claim 2, wherein the control data comprises allocation data, which indicates to which subset of intervals of the transmission time intervals the redundancy data transport block is allocated, wherein the signal processing device is configured for using the allocation data for processing the redundancy data transport block.

7. The receiver according to claim 2, wherein the control data comprises start data, which indicates at what point in time within a respective transmission time interval the redundancy data transport block starts, wherein the signal processing device is configured for using the start data for processing the redundancy data transport block and/or wherein the control data comprises end data, which indicates at what point in time within the respective transmission time interval the redundancy data transport block ends, wherein the signal processing device is configured for using the end data for processing the redundancy data transport block.

8. The receiver according to claim 2, wherein the payload data transport block is a first payload data transport block of a plurality of payload data transport blocks, and wherein the data signal comprises a plurality of redundancy data transport blocks, and wherein the plurality of redundancy data transport blocks comprises redundancy data transport blocks comprising different sizes in the frequency domain, and wherein the signal processing device is configured for processing the redundancy data transport blocks comprising different sizes in the frequency domain or in the time domain.

9. The receiver according to claim 1, wherein the control data comprises allocation data that indicates to which subset of intervals of the transmission time intervals the payload data transport block is allocated, and wherein the signal processing device is configured for using the allocation data for processing the payload data transport block.

10. The receiver according to claim 1, wherein the control data comprises start data that indicates a first point in time within a respective transmission time interval, and wherein the first point in time indicates a time that the payload data transport block starts, wherein the signal processing device uses the start data for processing the payload data transport block, and/or wherein the control data comprises end data that indicates a second point in time within the respective transmission time interval, and wherein the second point in time indicates a time that the payload data transport block ends, wherein the signal processing device uses the end data for processing the payload data transport block.

11. The receiver according to claim 1, wherein the data portion complies with a semi-persistent scheduling scheme, wherein the signal processing device is configured for processing the data portion complying with the semi-persistent scheduling scheme.

12. The receiver according to claim 1, wherein the payload data transport block is a first payload data transport block of a plurality of payload data transport blocks, and wherein the data signal comprises the plurality of payload data transport blocks, and wherein the plurality of payload data transport blocks comprises payload data transport blocks comprising different sizes in the time domain, and wherein the signal processing device is configured for processing the payload data transport blocks comprising different sizes in the time domain.

13. A transmitter for a wireless communication system, wherein the transmitter is configured to transmit a data signal comprising a time domain and a frequency domain, the data signal comprising control data and payload data, the data signal further comprising a data portion comprising a payload data transport block comprising a payload data package comprising of a portion of the payload data, and wherein the transmitter is configured for transmitting the data signal over transmission time intervals, and wherein a length of one of the transmission time intervals is shorter than a duration of the data portion such that the data portion is transmitted over more than one of the transmission time intervals, and wherein the length of one of the transmission time intervals is shorter than the duration of the payload data transport block, and wherein the payload data transport block is transmitted over immediately subsequent transmission time intervals of the transmission time intervals such that the payload data transport block is transmitted over more than one of the immediately subsequent transmission time intervals, and wherein the data signal comprises a plurality of frames, each frame comprising a plurality of subframes, and each subframe comprising symbols in the time domain and frequency ranges in the frequency domain, and wherein a combination of a symbol of the symbols and a frequency range of the frequency ranges defines a resource element, and wherein the data portion comprises a plurality of resource elements allocated to the payload data, and wherein the transmitter is to receive frequency range data, and wherein the frequency range data indicates which subset of ranges of the frequency ranges of the data signal is assigned to the payload data transport block for each of the immediately subsequent transmission time intervals over which the payload data transport block is transmitted, and wherein the frequency range data indicates that different ranges of the frequency ranges are assigned to the payload data transport block for different intervals of the immediately subsequent transmission time intervals over which the payload data transport block is transmitted, wherein the different intervals of the immediately subsequent transmission time intervals to which different ranges of the frequency ranges are assigned to, comprise different portions of the payload data package of the payload data transport block.

14. A wireless communication system, comprising:

a receiver according to claim 1, and/or a transmitter according to claim 13.

15. A method for receiving a data signal in a wireless communication system, the method comprising:

receiving, by a receiver, the data signal comprising a time domain and a frequency domain, the data signal comprising control data and payload data, the data signal further comprising at a data portion comprising a payload data transport block comprising a payload data package comprising of a portion of the payload data, and wherein the data signal is received over transmission time intervals, and wherein a length of one of the transmission time intervals is shorter than a duration of the data portion, so that the data portion is received over more than one of the transmission time intervals; and processing, by a signal processing device of the receiver, the data portion, wherein the length of one of the transmission time intervals is shorter than the duration of the payload data transport block, and wherein the payload data transport block is received over immediately subsequent transmission time intervals of the transmission time intervals such that the payload data transport block is received over more than one of the immediately subsequent transmission time intervals, and wherein the payload data transport block is processed by the signal processing device, and wherein the data signal comprises a plurality of frames, each frame comprising a plurality of subframes, and each subframe comprising symbols in the time domain and frequency ranges in the frequency domain, and wherein a combination of a symbol of the symbols and a range of the frequency ranges defines a resource element, and wherein the data portion comprises a plurality of resource elements allocated to the payload data, and and wherein the control data comprises frequency range data, and wherein the frequency range data indicates which subset of ranges of the frequency ranges of the data signal is assigned to the payload data transport block for each of the immediately subsequent transmission time intervals over which the payload data transport block is received, and wherein the frequency range data indicates that different ranges of the frequency ranges are assigned to the payload data transport block for different intervals of the immediately subsequent transmission time intervals over which the payload data transport block is received, wherein the different intervals of the immediately subsequent transmission time intervals to which different ranges of the frequency ranges are assigned to, comprise different portions of the payload data package of the payload data transport block, and wherein the frequency range data is used by the signal processing device for processing the payload data transport block.

16. A method for transmitting a data signal in a wireless communication system, the method comprising:

transmitting, by a transmitter, the data signal in such way, that the data signal comprises a time domain and a frequency domain, that the data signal comprises control data and payload data, that the data signal further comprises a data portion comprising a payload data transport block comprising a payload data package comprising of a portion of the payload data, and that the data signal is transmitted over transmission time intervals, and wherein a length of one of the transmission time intervals is shorter than a duration of the data portion, so that the data portion is transmitted over more than one of the transmission time intervals, and wherein the length of one of the transmission time intervals is shorter than the duration of the payload data transport block, and wherein the payload data transport block is transmitted over immediately subsequent transmission time intervals of the transmission time intervals, so that the payload data transport block is transmitted over more than one of the immediately subsequent transmission time intervals, and wherein the data signal comprises a plurality of frames, each frame comprising a plurality of subframes, and each subframe comprising symbols in the time domain and frequency ranges in the frequency domain, and wherein a combination of a symbol of the symbols and a frequency range of the frequency ranges defines a resource element, and wherein the data portion comprises a plurality of resource elements allocated to the payload data, and wherein the transmitter receives frequency range data, and wherein the frequency range data indicates which subset of ranges of the frequency ranges of the data signal is assigned to the payload data transport block for each of the immediately subsequent transmission time intervals over which the payload data transport block is transmitted, and wherein the frequency range data indicates that different ranges of the frequency ranges are assigned to the payload data transport block for different intervals of the immediately subsequent transmission time intervals over which the payload data transport block is transmitted, wherein the different intervals of the immediately subsequent transmission time intervals to which different ranges of the frequency ranges are assigned to, comprise different portions of the payload data package of the payload data transport block.

17. A non-transitory digital storage medium having a computer program stored thereon to perform a method for receiving a data signal in a wireless communication system, the method comprising:

receiving, by a receiver, the data signal comprising a time domain and a frequency domain, the data signal comprising control data and payload data, the data signal further comprising a data portion comprising a payload data transport block comprising a payload data package comprising of a portion of the payload data, wherein the data signal is received over transmission time intervals, and wherein a length of one of the transmission time intervals is shorter than a duration of the data portion such that the data portion is received over more than one of the transmission time intervals; and processing, by a signal processing device of the receiver, the data portion, and wherein the length of one of the transmission time intervals is shorter than the duration of the payload data transport block, and wherein the payload data transport block is received over immediately subsequent transmission time intervals of the transmission time intervals such that the payload data transport block is received over more than one of the immediately subsequent transmission time intervals, and wherein the payload data transport block is processed by the signal processing device, and wherein the data signal comprises a plurality of frames, each frame comprising a plurality of subframes, and each subframe comprising symbols in the time domain and frequency ranges in the frequency domain, and wherein a combination of a symbol the symbols and a range of the frequency ranges defines a resource element, and wherein the data portion comprises of a plurality of the resource elements allocated to the payload data, and and wherein the control data comprises frequency range data, and wherein the frequency range data indicates which subset of ranges of the frequency ranges of the data signal are assigned to the payload data transport block for each of the immediately subsequent transmission time intervals over which the payload data transport block is received, and wherein the frequency range data indicates that different ranges of the frequency ranges are assigned to the payload data transport block for different intervals of the immediately subsequent transmission time intervals over which the payload data transport block is received, wherein the different intervals of the immediately subsequent transmission time intervals to which different ranges of the frequency ranges are assigned to, comprise different portions of the payload data package of the payload data transport block, and wherein the frequency range data is used by the signal processing device for processing the payload data transport block.

18. A non-transitory digital storage medium having a computer program stored thereon to perform a method for transmitting a data signal in a wireless communication system, the method comprising:

transmitting, by a transmitter, the data signal over transmission time intervals, wherein the data signal comprises a time domain and a frequency domain, and wherein the data signal comprises control data and payload data, and wherein the data signal further comprises a data portion comprising a payload data transport block comprising a payload data package comprising a portion of the payload data, and wherein a length of one of the transmission time intervals is shorter than a duration of the data portion such that the data portion is transmitted over more than one of the transmission time intervals, and wherein the length of one of the transmission time intervals is shorter than the duration of the payload data transport block, and wherein the payload data transport block is transmitted over immediately subsequent transmission time intervals of the transmission time intervals such that the payload data transport block is transmitted over more than one of the immediately subsequent transmission time intervals, and wherein the data signal comprises a plurality of frames, each frame comprising a plurality of subframes, and each subframe comprising symbols in the time domain and frequency ranges in the frequency domain, and wherein a combination of a symbol of the symbols and a range of the frequency ranges defines a resource element, and wherein the data portion comprises a plurality of the resource elements allocated to the payload data, and wherein the transmitter receives the control data which comprises frequency range data, and wherein the frequency range data indicates which subset of ranges of the frequency ranges of the data signal are assigned to the payload data transport block for each of the immediately subsequent transmission time intervals over which the payload data transport block is transmitted, and wherein the frequency range data indicates that different ranges of the frequency ranges are assigned to the payload data transport block for different intervals of the immediately subsequent transmission time intervals over which the payload data transport block is transmitted, wherein the different intervals of the immediately subsequent transmission time intervals to which different ranges of the frequency ranges are assigned to, comprise different portions of the payload data package of the payload data transport block.

* * * * *